United States Patent

Kato

[11] Patent Number: 5,579,245
[45] Date of Patent: Nov. 26, 1996

[54] VEHICLE SLIP ANGLE MEASURING METHOD AND A DEVICE THEREFOR

[75] Inventor: Manabu Kato, Okazaki, Japan

[73] Assignee: Mitsubishi Jidosha Kogyo Kabushiki Kaisha, Tokyo, Japan

[21] Appl. No.: 191,082

[22] Filed: Feb. 4, 1994

[30] Foreign Application Priority Data

Mar. 17, 1993 [JP] Japan ..................... 5-057421

[51] Int. Cl.$^6$ ..................................... G01B 7/00
[52] U.S. Cl. .................. 364/559; 364/424.05; 395/905; 395/913
[58] Field of Search ................... 364/559, 424.01, 364/424.03, 424.04, 424.05, 425, 426.04, 426.01, 426.03; 180/140, 142, 141, 79.1, 79, 197; 395/903, 905, 913, 2.41

[56] References Cited

U.S. PATENT DOCUMENTS

| | | | |
|---|---|---|---|
| 4,718,685 | 1/1988 | Kawabe et al. | 280/91 |
| 5,003,480 | 3/1991 | Mori et al. | 364/424.05 |
| 5,228,757 | 7/1993 | Ito et al. | 364/426.01 |
| 5,361,213 | 11/1994 | Fujieda et al. | 395/905 |
| 5,386,365 | 1/1995 | Nagaoha | 364/424.05 |

FOREIGN PATENT DOCUMENTS

| | | | |
|---|---|---|---|
| 0198450 | 10/1986 | European Pat. Off. | 180/140 |
| 0441522 | 8/1991 | European Pat. Off. | |
| 4300844 | 7/1993 | Germany. | |
| 4138970 | 5/1992 | Japan. | |
| 4149605 | 5/1992 | Japan. | |
| 4189631 | 7/1992 | Japan. | |
| 4372409 | 12/1992 | Japan. | |

*Primary Examiner*—James P. Trammell
*Assistant Examiner*—Hal D. Wachsman

[57] ABSTRACT

A vehicle slip angle measuring device includes an approximate calculation block for deriving an approximate value of a vehicle centroid slip angle by use of an approximate expression derived from a linear two-degree-of-freedom vehicle model. The approximate value is derived based on outputs from a steering wheel sensor, vehicle velocity sensor and yaw angular velocity sensor. The device further includes a preprocessing block for preprocessing outputs from the above three sensors, longitudinal acceleration sensor and lateral acceleration sensor to create input information. Finally, the device includes a learned neural network for receiving the approximate value and input information and for outputting a correction value corresponding to a deviation between an actual slip angle and the approximate value. The correction value from the neural network is added to the approximate value from the approximate calculation block to derive a precise vehicle centroid slip angle.

20 Claims, 6 Drawing Sheets

VEHICLE SLIP ANGLE MEASURING METHOD AND A DEVICE THEREFOR

BACKGROUND OF THE INVENTION

1. Field of the Invention

This invention relates to a vehicle slip angle measuring method and a device therefor suitable for a vehicle having a four-wheel steering system.

2. Description of the Related Art

A four-wheel steering system for steering the front and rear wheels of a vehicle at the time of turning the vehicle to enhance the turning performance and steering stability of the vehicle is typically operable to steer the rear wheels by an angle corresponding to the vehicle velocity and the steering angle of the front wheels. Also known is a four-wheel steering system which detects the vehicle centroid slip angle, and steers the front and rear wheels to set the slip angle to zero. According to the slip angle zeroing control, the vehicle can be directed in the vehicle traveling direction even at the turning time. This is convenient for driving.

Conventionally, for example, an optical non-contact type ground speed meter (vector speed meter) is used to detect the vehicle centroid slip angle. In this case, the vehicle centroid slip angle is derived from the longitudinal velocity and lateral velocity of the vehicle measured by the ground speed meter. However, the ground speed meter is lowered in the detection precision depending on the road surface condition, and is large in size and expensive. Therefore, the practical applications of the slip angle zeroing control using the ground speed meter in commercially available vehicles is low.

OBJECT AND SUMMARY OF THE INVENTION

An object of this invention is to provide a vehicle slip angle measuring method and a device therefor capable of detecting the vehicle slip angle with high precision, without using a special detection device.

A vehicle slip angle measuring method according to one aspect of this invention comprises steps of: (a) detecting a steering state of the front wheels of a vehicle and outputting front wheel steering information; (b) detecting a motion state of the vehicle and outputting motion information; (c) deriving an approximate value of the vehicle slip angle based on the front wheel steering information and the motion information respectively output in the steps (a) and (b); (d) supplying the front wheel steering information and the motion information respectively output in the steps (a) and (b) and the approximate value derived in the step (c) to a learned neural network, to estimate a correction value corresponding to a deviation between the derived approximate value and the actual value of the vehicle slip angle; and (e) outputting a value derived by correcting the approximate value derived in the step (c), by using the correction value estimated in the step (d), as the vehicle slip angle.

Further, a vehicle slip angle measuring device according to another aspect of this invention comprises first detection means for detecting a steering state of the front wheels of a vehicle and outputting front wheel steering information; second detection means for detecting a motion state of the vehicle and outputting motion information; calculation means for deriving an approximate value of the vehicle slip angle based on the front wheel steering information and the motion information respectively output from the first and second detection means; a learned neural network for estimating a correction value, corresponding to a deviation between the derived approximate value and the actual value of the vehicle slip angle, based on the front wheel steering information and the motion information respectively output from the first and second detection means and the approximate value derived by the calculation means; and correction means for outputting a value derived by correcting the approximate value derived by the calculation means, by using the correction value estimated by the learned neural network, as the vehicle slip angle.

The advantage of this invention is that a precise vehicle slip angle can be measured by correcting the approximate value of the vehicle slip angle derived based on the front wheel steering information and the motion information by using the correction value output from the learned neural network. According to this invention, since it is unnecessary to use a special detection device such as an optical ground speed meter, the cost for constructing the detection system can be lowered and the installation space therefor can be reduced. Further, the neural network of this invention, having a function of estimating a correction value corresponding to a deviation between the actual slip angle and the approximate value of the slip angle, can be more easily constructed in comparison with a case where a neural network is constructed to estimate the actual slip angle based on the front wheel steering information and the motion information. Thus, this invention is made sufficiently practical and can be applied to commercially available vehicles.

Other objects, features and advantages of this invention will become more apparent from the following description. However, it should be understood that the detailed description and specific examples, while indicating preferred embodiment of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
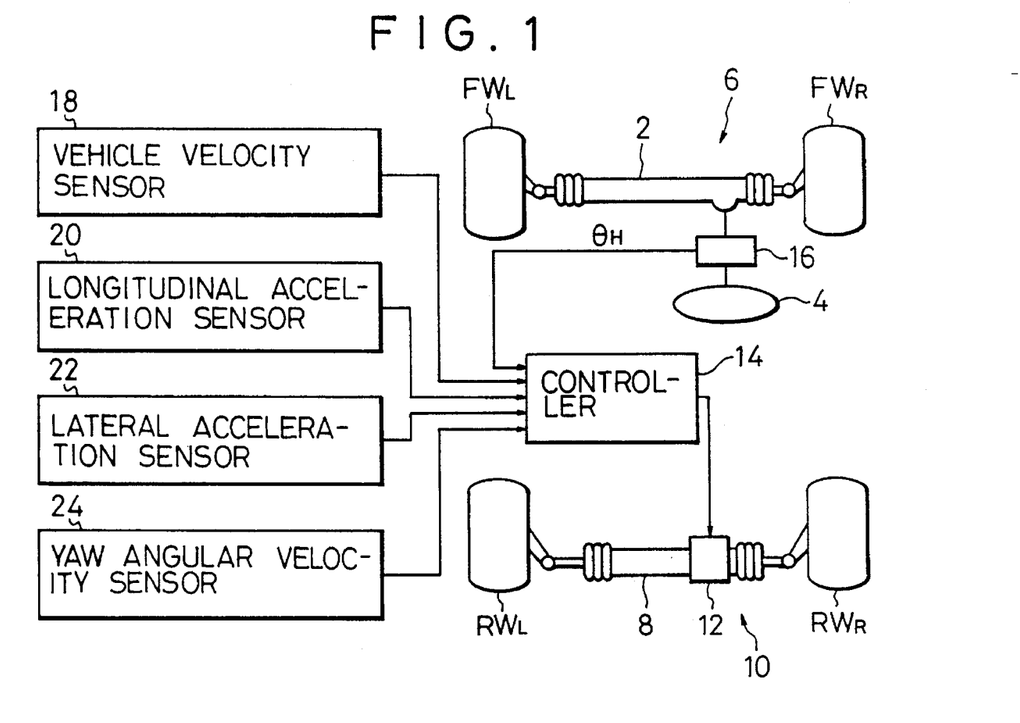
FIG. 1 is a schematic diagram showing a four-wheel steering vehicle having a vehicle centroid slip angle measuring device incorporated therein.

In FIG. 1, a four-wheel steering vehicle (4WS vehicle), on which a vehicle centroid slip angle measuring device according to one embodiment of this invention is mounted, is schematically shown. The 4WS vehicle has a front wheel steering system 6, including a power cylinder 2 and a rack and pinion mechanism (not shown), for steering front wheels FWL, FWR in response to the operation of a steering wheel 4, and a rear wheel steering system 10, including a rear wheel actuator 8 constructed by an oil cylinder, for steering rear wheels RWL, RWR.

More specifically, the rear wheel steering system 10 includes an electromagnetic valve 12 attached to the rear wheel actuator 8. The opening direction and opening degree of the electromagnetic valve 12 are controlled by a control signal from a controller 14, so that the rear wheels RWL, RWR are steered via the rear wheel actuator 8.

Various types of sensors which are also used in the vehicle centroid slip angle measuring device are connected to the controller 14. These sensors include a steering wheel angle sensor 16, vehicle velocity sensor 18, longitudinal acceleration sensor 20, lateral acceleration sensor 22, and yaw angular velocity sensor 24.

The steering wheel angle sensor 16 detects the steering angle of the steering wheel 4, that is, steering wheel angle $\theta H$. Further, the vehicle velocity sensor 18 detects the velocity of the vehicle or vehicle velocity V. The vehicle velocity sensor 18 may be a speed meter of the vehicle. In a case where a wheel velocity sensor is mounted on each of the wheels, it is possible to set a smaller one of the average front wheel velocity derived by averaging outputs of the wheel velocity sensors of the front wheels FWL, FWR, and the average rear wheel velocity derived by averaging outputs of the wheel velocity sensors of the rear wheels RWL, RWR, as the vehicle velocity V.

The longitudinal acceleration Sensor 20, lateral acceleration sensor 22 and yaw angular velocity sensor 24 are respectively used to detect the longitudinal acceleration GZ of the vehicle, the lateral acceleration GY of the vehicle and the yaw angular velocity $\psi$ of the vehicle. Therefore, the steering wheel angle $\theta H$, vehicle velocity V, longitudinal acceleration GZ, lateral acceleration GY and yaw angular velocity $\psi$ are input from the respective sensors to the controller 14.

Figure 2:
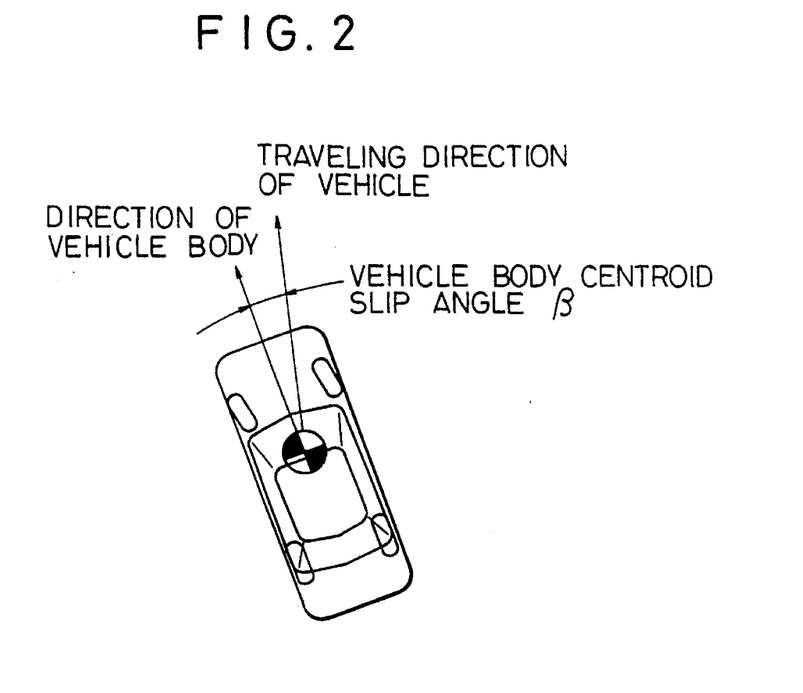
FIG. 2 is a view for illustrating the vehicle centroid slip angle.
Figure 3:
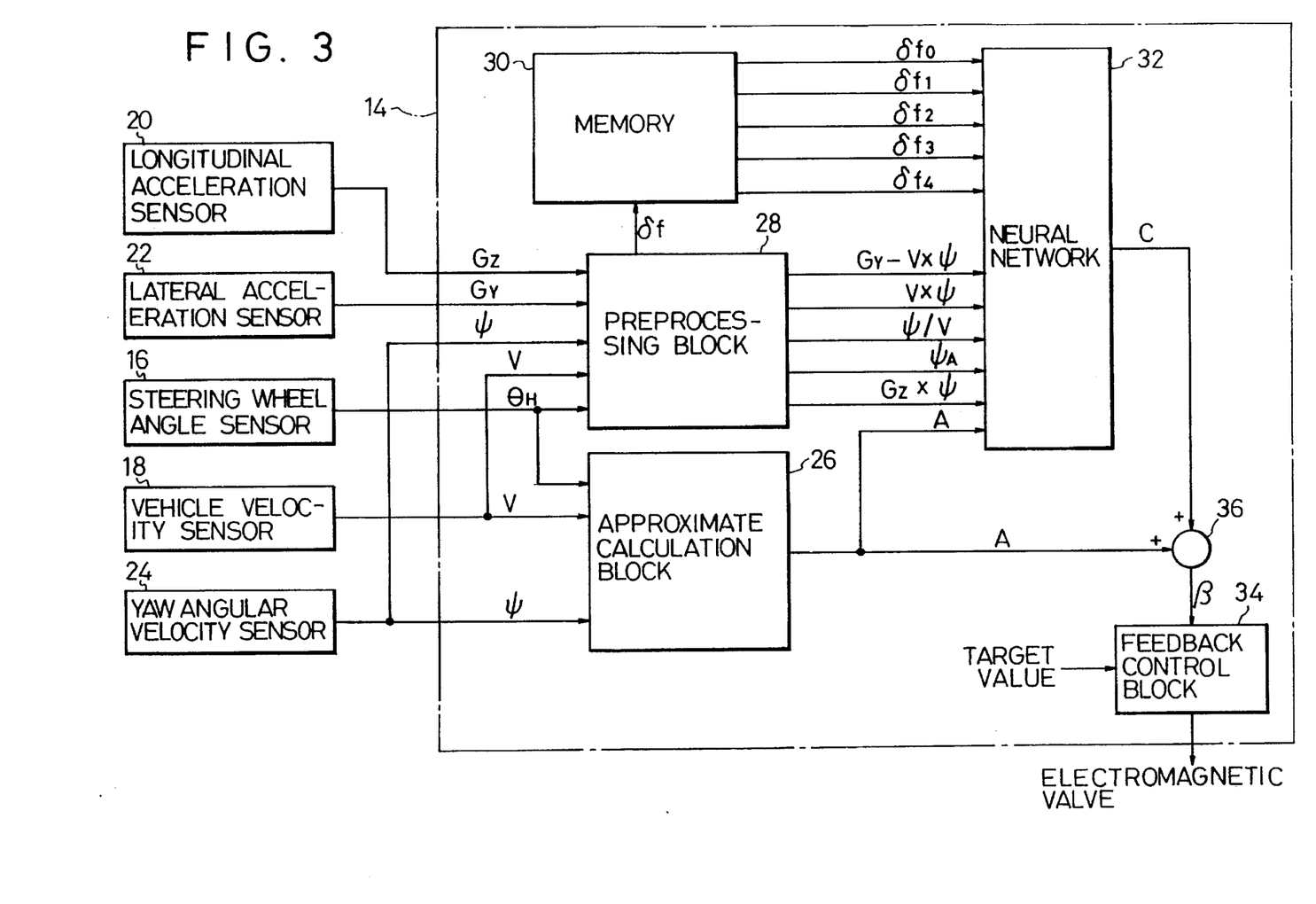
FIG. 3 is a block diagram showing a section for measuring the vehicle centroid slip angle in a controller shown in FIG. 2.

The controller 14 has a function of calculating a vehicle slip angle, more specifically, a side slip angle at the centroid of the vehicle body (angle $\beta$ between the traveling direction of the vehicle and the direction of the vehicle body (refer to FIG. 2)), based on detection signals from the various types of sensors described above, and a function of controlling the steering operation of the rear wheels RWL, RWR based on the result of the above measurement. More specifically, the controller 14 includes an approximate calculation block 26, preprocessing block 28, memory 30, neural network 32, and feedback control block 34, as shown in FIG. 3.

The approximate calculation block 26 is supplied with detection signals from the steering wheel angle sensor 16, vehicle velocity sensor 18, and yaw angular velocity sensor 24, that is, the steering wheel angle $\theta H$, vehicle velocity V, and yaw angular velocity $\psi$, and derives the approximate value A of the vehicle centroid slip angle $\beta$ based on the input detection signals according to the following approximate expression (4). The approximate expression is derived from a General two-degree-of-freedom vehicle model shown in FIG. 4 in the following manner.

Figure 4:
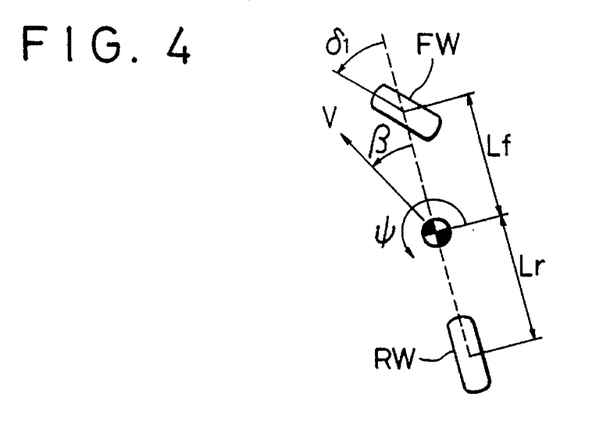
FIG. 4 is a view showing a linear two-degree-of-freedom vehicle model.

The equations of motion of the vehicle model are:

$$m \times V \times (d\beta/dt) + 2 \times (Kf+Kr) \times \beta + \{m \times V + (2/V) \times (Lf \times Kf - Lr \times Kr)\} \times \psi = 2 \times Kf \times \delta f \quad (1)$$

$$2 \times (Lf \times Kf - Lr \times Kr) \times \beta + I \times (d\psi/dt) + (2/V) \times (Lf2 \times Kf + Lr2 \times Kr) \times \psi = 2 \times Lf \times Kf \times \delta f \quad (2)$$

where m is the mass of the vehicle, Kf and Kr are equivalent cornering powers of the front and rear wheels, I is the yaw inertia moment, Lf is the distance from the front axle to the centroid of the vehicle, Lr is the distance from the rear axle to the centroid, and $\delta f$ is the front wheel steering angle.

Figure 5:
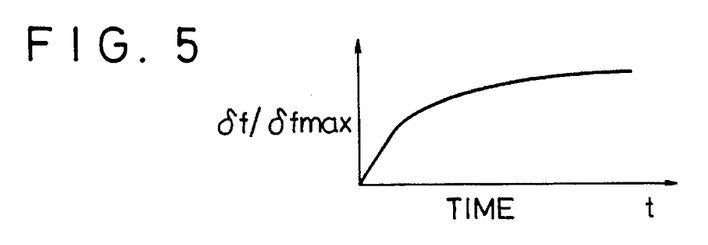
FIG. 5 is a graph showing a stepwise steering input.

Based on the solution for the yaw angular velocity $\psi$ and the vehicle centroid slip angle $\beta$ in the time region which are determined by linearly analyzing the response obtained when a stepwise steering input, as shown in FIG. 5 and represented by the following equation (3), is supplied to the vehicle model expressed by the equations (1), (2), the following equation (4) can be obtained, which serves as an approximate equation for deriving the approximate value A of the slip angle $\beta$.

$$\delta f = \delta fMAX \times (1 - e - 2t) \quad (3)$$

where $\delta fMAX$ is the maximum steering angle.

$$A = \beta 0 \times + K0 \times \{\psi - \psi(1 - e - 2t)\} \quad (4)$$

where $\beta 0$ is a value obtained by dividing a $\beta$ stationary value, determined by the vehicle velocity V and the front wheel steering angle $\delta f$, by the yaw angular velocity $\psi$, and K0 is a correction coefficient in the transition state for the first term.

As is clearly understood from the approximate equation (4), the approximate value A of the vehicle centroid slip angle $\beta$ can be expressed as a function of the vehicle velocity V, front wheel steering angle $\delta f$ and yaw angular velocity $\psi$. Further, the front wheel steering angle $\delta f$ can be expressed as a function of the steering wheel angle $\theta H$ and steering gear ratio. Therefore, the approximate value A can be derived based on the vehicle velocity V, steering wheel angle $\theta H$ and yaw angular velocity $\psi$ according to the approximate equation (4).

On the other hand, the following equations (5), (6) are derived by rewriting the equations (1), (2).

$$B = \{(1/2) \times (Kf+Kr)\} \times \{2 \times Kf \times \delta f - m \times V \times (d\beta/dt) - m \times V \times \delta - 2(Lf \times Kf - Lr \times Kr) \times (\psi/V)\} \quad (5)$$

$$\beta = \{(1/2) \times (K \times Lf + Kr \times Lr)\} \times \{2 \times Lf \times Kf \times \delta f - I \times \delta A - 2 \times (Lf2 \times Kf + Lr2 \times Kr) \times (\delta/V)\} \quad (6)$$

If the slip angle $\beta$ is sufficiently small, the following equation (7) can be obtained. By rewriting the equation (7), the following equation (8) can be also obtained.

$$GY = V \times (d\beta/dt + \psi) \quad (7)$$

$$V \times (d\beta/dt) = GY - \psi \times V \quad (8)$$

As is clearly understood from the equations (5), (6) and (8), the vehicle centroid slip angle $\beta$ is expressed by the linear sum of five quantities of state including the "front wheel steering angle ($=\delta f$)", "lateral acceleration–vehicle velocity×yaw angular velocity ($=GY-V \times \psi$)", "vehicle velocity×yaw angular velocity ($=V \times \psi$)", "yaw angular velocity÷vehicle velocity ($=\psi/V$)", and "yaw angular acceleration ($=\psi A$)".

As described above, the approximate equation (4) becomes valid only when the front wheels are steered according to a specified pattern indicated by the equation (3). In the case of an actual vehicle, it is understood that coefficients of quantities of state corresponding to the coefficients such as Kf, Kr in the equations (5), (6) are functions of the non-linearity of the tires, load shifting and the like.

However, in the approximate equation, the coefficients $K0$, $\beta 0$ and the yaw angular velocity $\psi$, as the quantity of state, are constants. Thus, since a variation in the front wheel steering pattern, non-linearity of the tires and load shifting are not taken into consideration in the approximate equation, the approximate value A of the slip angle $\beta$ derived by use of the approximate equation contains a deviation with respect to the actual vehicle centroid slip angle $\beta$.

Therefore, in the slip angle measuring device of this invention, the approximate value A derived by the approximate calculation block 26 is corrected so as to eliminate a deviation between the actual slip angle $\beta$ and the approximate value A. To achieve the above purpose, the slip angle measuring device further includes a neural network 32 for creating a correction value C corresponding to the deviation, and a preprocessing block 28 for creating input information (quantity of state) to the neural network 32. With the device of the above construction, the load for calculation imposed on the neural network 32 is alleviated in comparison with a case where the neural network is constructed to derive the slip angle $\beta$ based on input information. Therefore, the neural network 32 can be more easily constructed, and the slip angle $\beta$ can be precisely detected.

More specifically, in the preprocessing block 28, the calculation process for converting the steering wheel angle sensor output $\theta H$ into a front wheel steering angle $\delta f$ is effected, and the thus calculated front wheel steering angle $\delta f$ is stored into the memory 30 in a time series fashion. The time-series data used to express a front wheel steering pattern with respect to the time base is comprised of a front wheel steering angle $\delta f0$ at the present time, front wheel steering angle $\delta f1$ before a period of time t1 (0.1 second), front wheel steering angle $\delta f2$ before a period of time t2 (0.2 second), front wheel steering angle $\delta f3$ before a period of time t3 (0.3 second), and front wheel steering angle $\delta f4$ before a period of time t4 (0.4 second), for example. The time-series data items $\delta f0$ to $\delta f4$ are input to the neural network 32.

Further, the preprocessing block 28 is supplied with the vehicle velocity V, longitudinal acceleration GZ, lateral acceleration GY and yaw angular velocity $\psi$ from the vehicle velocity sensor 18, longitudinal acceleration sensor 20, lateral acceleration sensor 22 and yaw angular velocity sensor 24. Then, the preprocessing block 28 calculates the "lateral acceleration−vehicle velocity×yaw angular velocity $(=GY-V\times\psi)$", "vehicle velocity×yaw angular velocity $(=V\times\psi)$", "yaw angular velocity ÷vehicle velocity $(=\psi/V)$", and "yaw angular acceleration $(=\psi A)$" which are treated as the above quantities of state, and the "longitudinal acceleration× yaw angular velocity $(=Gz\times\psi)$" which is the quantity of state related to the longitudinal acceleration GZ and not taken into consideration in the linear two-degree-of-freedom model of FIG. 4. The results of calculation are supplied from the preprocessing block 28 to the neural network 32.

Further, the neural network 32 is supplied with the approximate value A of the slip angle $\beta$, as input information, from the approximate calculation block 26.

Figure 6:
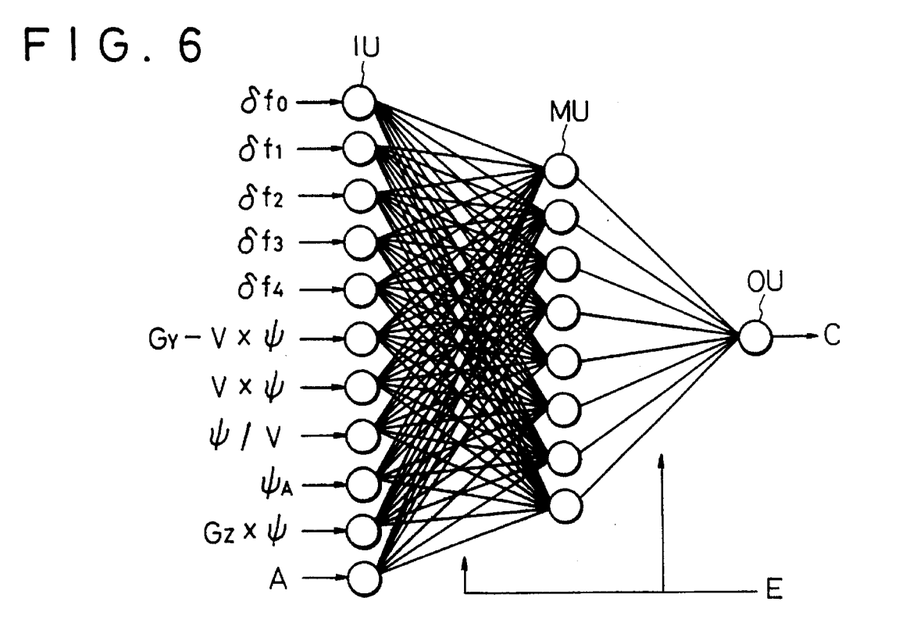
FIG. 6 is a schematic diagram showing the construction of a neural network shown in FIG. 3.

The neural network 32, which is of a multilayered type whose schematic construction is shown in FIG. 6, is constructed by an input layer having eleven input units IU to which eleven types of input information items are input, an intermediate layer having an appropriate number of, for example, eight intermediate units MU, and an output layer having one output unit OU for outputting a correction value C.

Figure 7:
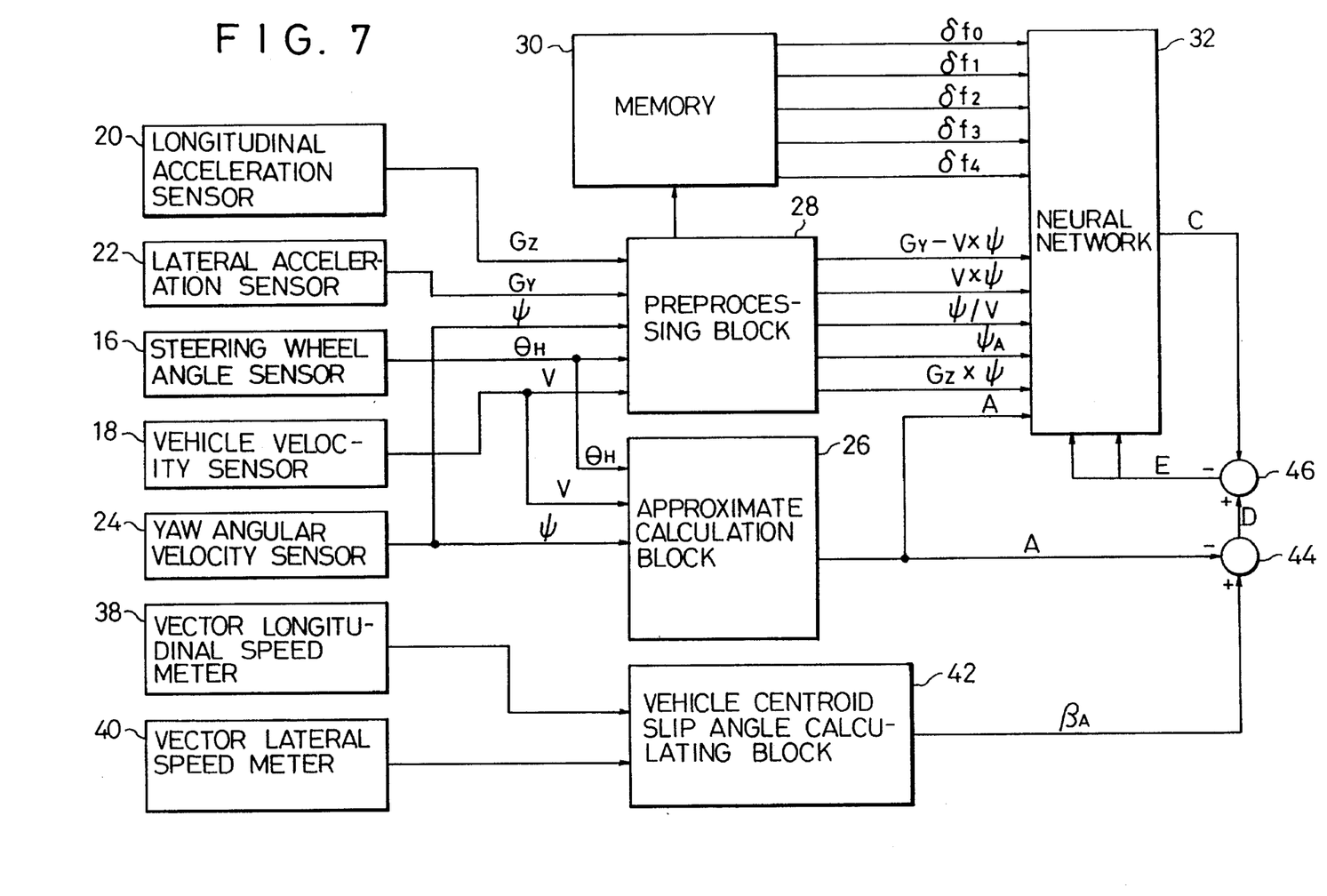
FIG. 7 is a block diagram showing a learning system of the neural network of FIG. 3.

Preferably, the respective degrees of coupling (weights of coupling) between associated units in the neural network 32 are previously learned by a back propagation method, and the learning operation is effected by use of a learning system shown in FIG. 7.

The learning system has a vector longitudinal speed meter 38 and a vector lateral speed meter 40, in addition to the sensor group and the function blocks of the controller 14 shown in FIG. 3. These speed meters 38, 40 are connected to a vehicle centroid slip angle calculating block 42 provided in the controller 14. The block 42 calculates the actual vehicle centroid slip angle $\beta A$ based on outputs of the vector longitudinal speed meter 38 and vector lateral speed meter 40, that is, the longitudinal acceleration and lateral acceleration according to a known calculating equation (9).

$$\beta A = \tan^{-1}(\text{lateral acceleration} \div \text{longitudinal acceleration}) \quad (9)$$

On the other hand, the approximate calculation block 26 calculates the approximate value A of the slip angle $\beta$ based on outputs $\theta H$, V, $\psi$ from the steering wheel angle sensor 16, vehicle velocity sensor 18 and yaw angular velocity sensor 24. Further, the preprocessing block 28 derives the front wheel steering angle $\delta f$ based on the steering wheel angle sensor output $\theta H$, and derives the quantities of state $GY-V\times\psi$, $V\times\psi$, $\psi/V$, $\psi A$ and $GZ\times\psi$ based on various sensor outputs V, GZ, GY, $\psi$. The neural network 32 derives a correction value C based on the memory outputs $\delta f0$ to $\delta f4$ and the preprocessing block outputs $GY-V\times\psi$, $V\times\psi$, $\psi/V$, $\psi A$, $GZ\times\psi$.

The actual vehicle centroid slip angle $\beta A$, which is an output of the vehicle centroid slip angle calculating block 42, and the approximate value A from the approximate calculation block 26 are input to a subtracter 44 which outputs a deviation D between the actual vehicle centroid slip angle $\beta A$ and the approximate value A as teacher data.

Then, the deviation D from the subtracter 44 and the correction value C from the neural network 32 are input to a subtracter 46 which in turn outputs an error E between the deviation D and the correction value C to the neural network 32.

As is well known in the art, the learning rule of the back propagation is to learn the coupling degrees (coupling amounts) $\omega$ between the units in the neural network 32 so as to reduce the error E to a minimum.

More specifically, in the neural network 32, the product of an input to each unit (IU, MU, OU) in each layer and the coupling amount is accumulatively calculated, and a value of sigmoid function at the time when its variable assumes the accumulated value is calculated as an output value X (XI, XM, XO) of each unit.

Then, the error E at the output unit OU is calculated by the following equation (10) based on the differential value F0 of the sigmoid function expressing the input/output relation of the output unit OU, deviation D and output value XO (=correction value C) of the output unit OU.

$$E0 = (D - X0) \times F0 \quad (10)$$

Further, an error EM at each intermediate unit MU is calculated by the following equation (11) based on the differential value FM of the sigmoid function expressing the input/output relation of each intermediate unit MU of the intermediate layer, an error EO at the output unit OU, and the coupling amount $\omega 0M$ between each intermediate unit MU and the output unit OU.

$$EM = FM \times \Sigma(E0 \times \omega 0M) \quad (11)$$

Further, an error EI at each input unit IU is calculated by the following equation (12) based on the differential value FI of the sigmoid function expressing the input/output relation of each input unit IU of the input layer, an error E0 at each intermediate unit MU, and the coupling amount ωMI between each intermediate unit MU and each input unit IU.

$$EI = FI \times \omega(EM \times \omega MI) \quad (12)$$

Next, correction amounts Δω (ΔωID, ΔωMI, ΔωOM) of the coupling amounts ω (ωID, ωMI, ωOM) of the respective units (IU, MU, OU) of the respective layers with input data are calculated by the following equation (13) based on a learning constant η, errors E (EI, EM, EO) at the respective units of the respective layers and output values X (XI, XM, XO) of the respective units (IU, MU, OU) of the respective layers. The coupling amounts ωID indicate the coupling amounts of the input units IU with input data.

$$\Sigma \omega = \eta \times E \times X \quad (13)$$

The calculated correction amount Δω is added to the coupling amount ω (ωID, ωMI, ωOM) of each unit with input data, and thus an updated coupling amount ω(=ω+Δω) is obtained.

The above-described learning is repeatedly effected based on a large number of teacher data items made by taking various traveling conditions, road surface states and front wheel steering patterns into consideration.

As described above, in this embodiment, the learning process is effected in the running test of the vehicle on which the system of FIG. 7 is mounted. However, it is also possible to drive a nonlinear six-degree-of-freedom vehicle model by simulation on a large-scale computer, collect learning data and effect the learning process based on the collected learning data.

Therefore, the correction value C output from the learned neural network 32 is set to a value corresponding to the deviation D of the approximate value A from the vehicle centroid slip angle β. Hence, the sum obtained by adding together the correction value C output from the learned neural network 32 and the approximate value A output from the approximate calculation block 26 in an adder 36 as shown in FIG. 3 is set to a vehicle centroid slip angle β which coincides with the actual vehicle centroid slip angle βA.

The thus estimated vehicle centroid slip angle β is input to the feedback control block 34 from the adder 36, and the feedback control block 34 outputs a control signal to the electromagnetic valve 12 of the rear wheel actuator 8 according to a deviation between the target value (zero) and the vehicle centroid slip angle β, so that the rear wheel actuator 8 will control the steering angles of the rear wheels RWL, RWR so as to set the vehicle centroid slip angle β to zero.

Figure 8:
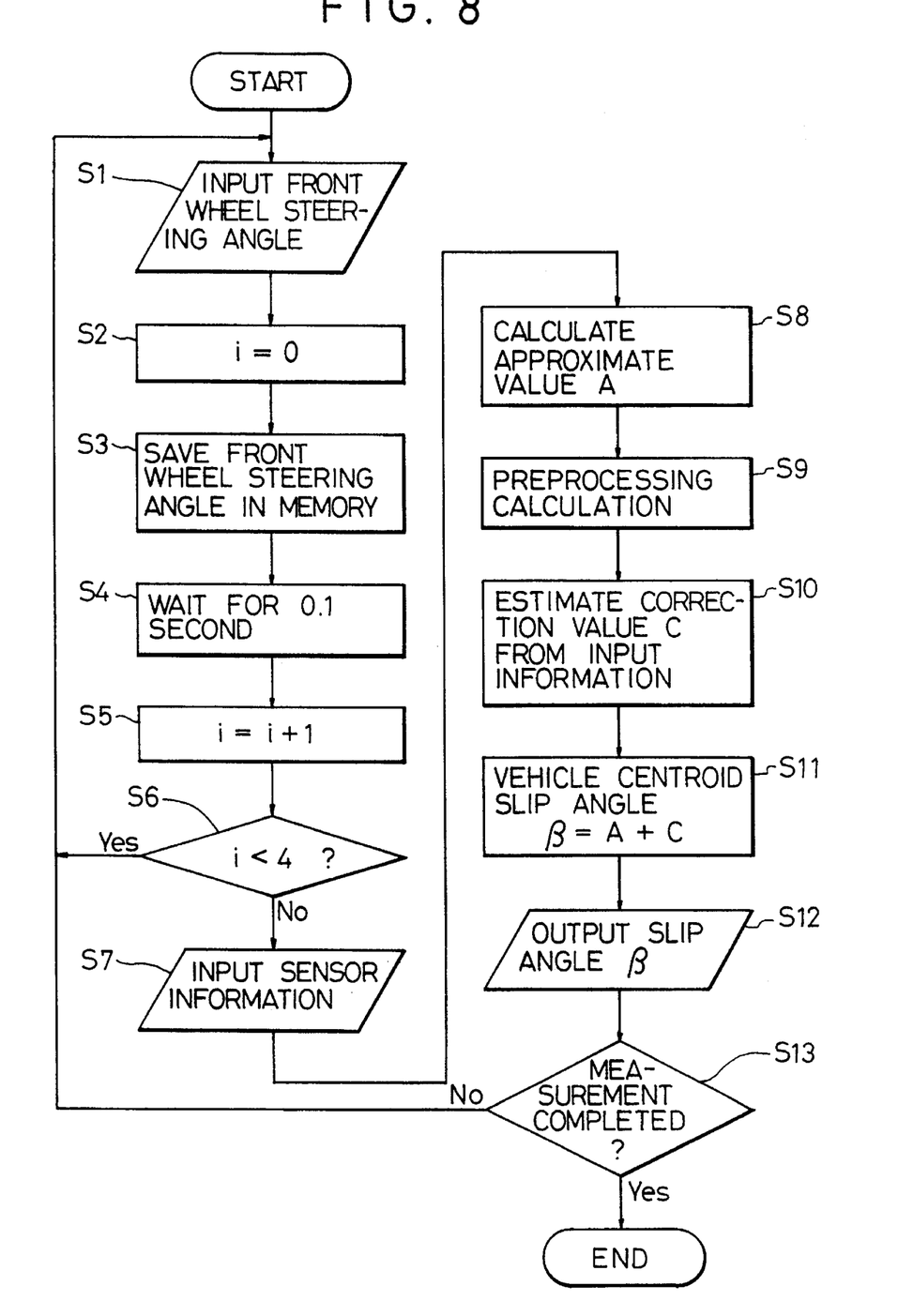
FIG. 8 is a flowchart showing a vehicle centroid slip angle calculating routine effected in the block diagram of FIG. 3.

The above-described procedure for measurement of the vehicle centroid slip angle can be expressed by the measurement routine shown in FIG. 8.

In the measurement routine, if the steering wheel angle θH or the front wheel steering angle δf is first input to the controller 14 in the step S1, a value i of the counter is set to "0" (step S2), and the input front wheel steering angle δf is stored or saved into the memory 30 (step S3). As described before, the front wheel steering angle δf can be derived by calculation in the preprocessing block 28 based on the steering wheel angle θH.

In the next step S4, the process waits for 0.1 second, then the value i of the counter is incremented by one (step S5), and whether or not the value i of the counter is smaller than 4 is checked (step S6).

If the determination result in the step S6 is true (YES), the steps succeeding the step S1 are repeatedly effected. Further, if the determination result becomes false (NO), the step S7 is entered. Therefore, when the determination result in the step S6 becomes "NO", time-series data items δf0, δf1, δf2, δf3, and δf4 associated with the front wheel steering angle δf are saved in the memory 30.

In the step S7, the vehicle velocity V, longitudinal acceleration GZ, lateral acceleration GY and yaw angular velocity ψ from the respective sensors 18, 20, 22, 24 are input to the controller 14, and the approximate value A is calculated by use of the approximate expression based on the inputs (step S8). Then, the aforementioned values GY–V×ψ, V×ψ, ψ/V, ψA, GZ×ψ are derived by the preprocessing calculation (step S9). These values, the time-series data items and the approximate value A of the slip angle β are supplied as input information to the learned neural network 32, and the neural network 32 estimates and outputs the correction value C (step S10). The adder 36 adds together the approximate value A and the correction value C to estimate the vehicle centroid slip angle β (step S11).

The estimated vehicle centroid slip angle β is output to the feedback control block 34 (step S12), and in the next step S13, whether the measurement routine should be completed or not is checked. That is, in this step, whether the steering wheel 4 of the vehicle is being steered or not is checked, for example. If the steering wheel is being steered, the routine is repeatedly effected. When the steering wheel 4 is returned to the neutral position, the process of the routine is completed.

Figure 9A:
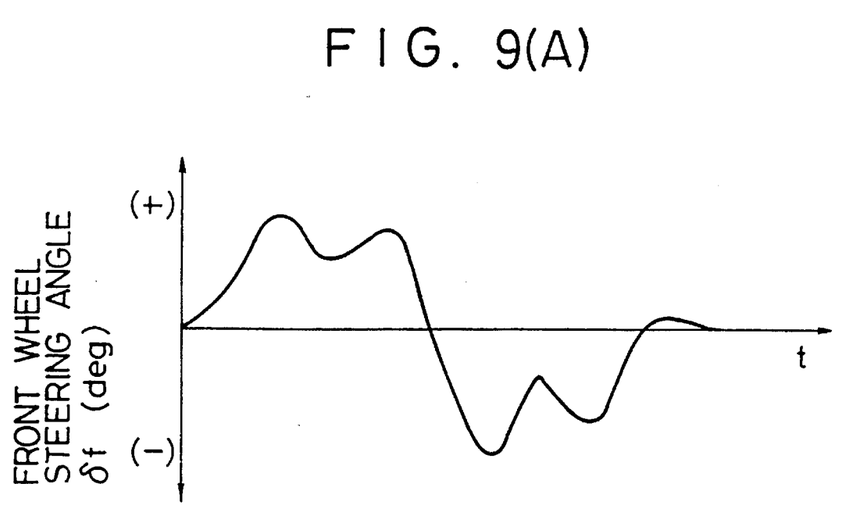
FIGS. 9(A)–(C) are graphs showing the relation between the calculated vehicle centroid slip angle, actual vehicle centroid slip angle and the approximate value thereof at the time of front wheel steering.
Figure 9B:
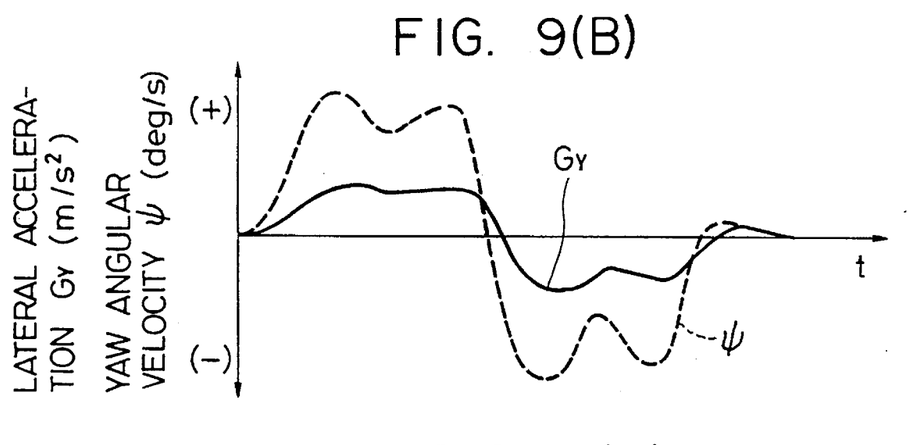
Figure 9C:
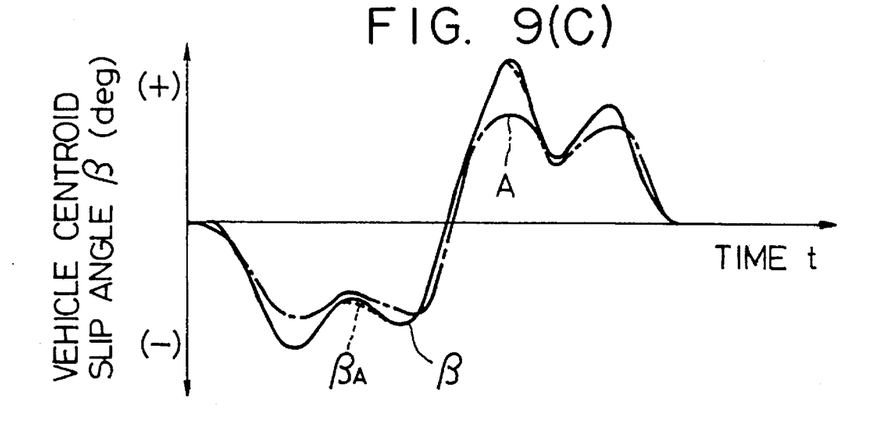

In FIG. 9, the relationship between the estimated vehicle centroid slip angle β and the actual vehicle centroid slip angle βA is shown, in addition to variations in the yaw angular velocity ψ and lateral acceleration GY caused when the front wheel angle δf is changed as shown in FIG. 9. It is understood that the vehicle centroid slip angle β and the actual vehicle centroid slip angle βA substantially coincide with each other. Hence., the vehicle centroid slip angle β can be precisely estimated according to the measurement device of this invention. In FIG. 9, the one-dot-dash line indicates a variation in the output of the approximate value A.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle slip angle measuring method, comprising steps of:

(a) detecting, using at least one sensor of the vehicle, a steering state of front wheels of a vehicle;

(b) detecting, using at least one sensor of the vehicle, a motion state of the vehicle;

(c) deriving an approximate value of a vehicle slip angle at a centroid of the vehicle based on the front wheel steering state and the motion state, respectively detected in said steps (a) and (b);

(d) supplying the front wheel steering state and the motion state, respectively detected in said steps (a) and (b) and the approximate value derived in said step (c) to a learned neural network, to estimate a correction value corresponding to a deviation between the approximate value and an actual value of the vehicle slip angle at the centroid of the vehicle; and (e) controlling the vehicle based upon a value derived by correcting the approximate value derived in said step (c), by using the correction value estimated in said step (d), as the vehicle slip angle at the centroid of the vehicle body.

2. A vehicle slip angle measuring method according to claim 1, further including a step of:

(f) effecting a learning operation for a neural network to construct the learned neural network, said step (f) including the sub-steps of:

(f1) detecting a steering state of the front wheels of the vehicle;

(f2) detecting a motion state of the vehicle;

(f3) deriving an approximate value of a vehicle slip angle based on the front wheel steering state and the motion state, respectively detected in said sub-steps (f1) and (f2);

(f4) supplying the front wheel steering state and the motion state, respectively detected in said sub-steps (f1) and (f2) and the approximate value derived in said sub-step (f3) to the neural network, to estimate a correction value corresponding to a deviation between the approximate value and an actual value of the vehicle slip angle;

(f5) detecting an actual value of the vehicle slip angle;

(f6) deriving a deviation between the actual value of the vehicle slip angle detected in said sub-step (f5) and the approximate value derived in said sub-step (f3); and (f7) supplying the front wheel steering state and the motion state, respectively detected in said sub-steps (f1) and (f2), the approximate value derived in said sub-step (f3), and a difference between the correction value estimated in said sub-step (f4) and the deviation calculated in said sub-step (f6) to the neural network, and changing an input/output characteristic of the neural network such that the difference is reduced to a minimum.

3. A vehicle slip angle measuring method according to claim 1, wherein said step (a) includes detecting a steering angle of the front wheels of the vehicle;

wherein said step (b) includes detecting a vehicle velocity and yaw angular velocity of the vehicle; and wherein said step (c) includes deriving the approximate value based on the front wheel steering angle, the vehicle velocity and the yaw angular velocity detected in said steps (a) and (b) by using an approximate expression which expresses an approximate value of the vehicle slip angle as a function of vehicle velocity, front wheel steering angle and yaw angular velocity of the vehicle, said approximate expression being derived from an equation of motion of the vehicle which is in turn derived from a linear mathematical vehicle model.

4. A vehicle slip angle measuring method according to claim 1, further including the step of:

(g) deriving at least one quantity of state from the front wheel steering state detected in said step (a) and/or the motion state detected in said step (b);

the vehicle slip angle being expressed by said at least one quantity of state or a sum thereof;

each of said at least one quantity of state being expressed as a function of a corresponding one or ones among the front wheel steering state detected in said step (a) and the motion state detected in said step (b);

each of said at least one quantity of state being input, in said step (d), to the learned neural network as the detected front wheel steering state and/or the detected motion state.

5. A vehicle slip angle measuring method according to claim 4, further including the step of:

(h) storing detected front wheel steering states, sequentially detected in said step (a) effected at a plurality of present and/or past timings, as time-series data, the time-series data being input, in said step (d), to the learned neural network as the detected front wheel steering state.

6. A vehicle slip angle measuring method according to claim 5, wherein said step (a) includes detecting a steering wheel angle of the vehicle;

wherein said step (g) includes deriving front wheel steering angles at said plurality of timings as said at least one quantity of state, based on steering wheel angles sequentially detected in said step (a); and wherein said step (h) includes storing front wheel steering angles at said plurality of timings as said time-series data.

7. A vehicle slip angle measuring method according to claim 5, wherein said step (a) includes detecting a steering wheel angle of the vehicle;

wherein said step (b) includes detecting a yaw angular velocity, longitudinal acceleration and lateral acceleration of the vehicle and a vehicle velocity;

wherein said step (g) includes deriving at least one of the following: (lateral acceleration−vehicle velocity×yaw angular velocity), (vehicle velocity ×yaw angular velocity), (yaw angular velocity÷vehicle velocity), (yaw angular acceleration), (longitudinal acceleration× yaw angular velocity) and (front wheel steering angles at said plurality of timings), as said at least one quantity of state, based on the yaw angular velocity, longitudinal acceleration, lateral acceleration and vehicle velocity detected in said step (b) and the steering wheel angle detected in said step (a); and wherein said step (h) includes storing front wheel steering angles at said plurality of timings as said time-series data.

8. A vehicle slip angle measuring method according to claim 4, wherein said step (b) includes detecting at least one of a yaw angular velocity, longitudinal acceleration and lateral acceleration of the vehicle and a vehicle velocity; and wherein said step (g) includes deriving said at least one quantity of state each expressed as a function of a corresponding one or ones of yaw angular velocity, longitudinal acceleration, lateral acceleration and vehicle velocity, based on at least one of the yaw angular velocity, longitudinal acceleration, lateral acceleration and vehicle velocity detected in said step (b).

9. A vehicle slip angle measuring method according to claim 8, wherein said at least one quantity of state includes at least one of the following: (lateral acceleration−vehicle velocity ×yaw angular velocity), (vehicle velocity×yaw angular velocity), (yaw angular velocity÷vehicle velocity), (yaw angular acceleration), and (longitudinal acceleration× yaw angular velocity).

10. A vehicle slip angle measuring method according to claim 1, wherein said step (e) includes outputting a value obtained by adding together the approximate value derived in said step (c) and the correction value estimated in said step (d) as said vehicle slip angle.

11. A vehicle slip angle measuring device comprising:

first detection means for detecting a steering state of front wheels of a vehicle;

second detection means for detecting a motion state of the vehicle;

calculation means for deriving an approximate value of a vehicle slip angle at a centroid of a body of the vehicle based on the front wheel steering state and the motion state respectively detected by said first and second detection means;

a learned neural network for estimating a correction value, corresponding to a deviation between the approximate value and an actual value of the vehicle slip angle at the centroid of the vehicle body, based on the front wheel steering state and the motion state respectively detected by said first and second detection means and the approximate value derived by said calculation means; and correction means for outputting a value derived by correcting the approximate value derived by said calculation means, by using the correction value estimated by said learned neural network, as the vehicle slip angle at the centroid of the vehicle body.

12. A vehicle slip angle measuring device according to claim 11, wherein said learned neural network is constructed by supplying a neural network with the front wheel steering state and the motion state respectively detected by said first and second detection means, the approximate value derived by said calculating means, and a difference between the correction value and a deviation of the approximate value from an actual value of the vehicle slip angle, and by changing an input/output characteristic of the neural network such that the difference is reduced to a minimum.

13. A vehicle slip angle measuring device according to claim 11, wherein said first detection means includes steering angle detection means for detecting a steering angle of the front wheels of the vehicle;

wherein said second detection means includes vehicle velocity detection means for detecting a vehicle velocity, and yaw angular velocity detection means for detecting a yaw angular velocity; and wherein said calculating means is so constructed as to derive said approximate value based on the front wheel steering angle, the vehicle velocity and the yaw angular velocity respectively detected by said steering angle detection means, said vehicle velocity detection means and said yaw angular velocity detection means, by using an approximate expression expressing an approximate value of the vehicle slip angle as a function of front wheel steering angle and yaw angular velocity of the vehicle and vehicle velocity, said approximate expression being derived from an equation of motion of the vehicle which is in turn derived from a linear mathematical vehicle model.

14. A vehicle slip angle measuring device according to claim 11, further including:

processing means for deriving at least one quantity of state from the front wheel steering state detected by said first detection means and/or the motion state detected by said second detection means, and for outputting the at least one quantity of state to said learned neural network, the vehicle slip angle being expressed by said at least one quantity of state or a sum thereof, each of said at least one quantity of state being expressed as a function of a corresponding one or ones of the front wheel steering state detected by said first detection means and the motion state detected by said second detection means.

15. A vehicle slip angle measuring device according to claim 14, wherein said processing means includes memory means for storing detected front wheel steering states, sequentially detected by said first detection means at a plurality of present and/or past timings, as time-series data, said processing means being operable to output the time series data stored in said memory means to said learned neural network as the detected front wheel steering state.

16. A vehicle slip angle measuring device according to claim 15, wherein said first detection means includes a steering wheel angle sensor for detecting a steering wheel angle of the vehicle;

wherein said calculating means derives front wheel steering angles at said plurality of present and or past timings, as said at least one quantity of state, based on steering wheel angles sequentially detected by said steering wheel angle sensor; and said memory means stores the front wheel steering angles at said plurality of timings as said time-series data.

17. A vehicle slip angle measuring device according to claim 15, wherein said first detection means includes a steering wheel angle sensor for detecting a steering wheel angle of the vehicle;

wherein said second detection means includes a yaw angular velocity sensor for detecting a yaw angular velocity of the vehicle, a longitudinal acceleration sensor for detecting a longitudinal acceleration of the vehicle, a lateral acceleration sensor for detecting a lateral acceleration of the vehicle and a vehicle velocity sensor for detecting a vehicle velocity;

wherein said calculating means derives at least one of the following: (lateral acceleration−vehicle velocity×yaw angular velocity), (vehicle velocity ×yaw angular velocity), (yaw angular velocity÷vehicle velocity), (yaw angular acceleration), (longitudinal acceleration× yaw angular velocity) and front wheel steering angles at said plurality of present and/or past timings, as said at least one quantity of state, based on the yaw angular velocity, the longitudinal acceleration, the lateral acceleration, the vehicle velocity and the steering wheel angle respectively detected by said yaw angular velocity sensor, said longitudinal acceleration sensor, said lateral acceleration sensor, said vehicle velocity sensor and said steering wheel angle sensor; and wherein said memory means stores the front wheel steering angles at said plurality of timings as said time-series data.

18. A vehicle slip angle measuring device according to claim 14, wherein said second detection means includes at least one of a yaw angular velocity sensor for detecting a yaw angular velocity of the vehicle, a longitudinal acceleration sensor for detecting a longitudinal acceleration of the vehicle, a lateral acceleration sensor for detecting a lateral acceleration of the vehicle, and a vehicle velocity sensor for detecting a vehicle velocity, and wherein said processing means includes calculation means for deriving said at least one quantity of state, each expressed as a function of a corresponding one or ones of yaw angular velocity, longitudinal acceleration, lateral acceleration and vehicle velocity, based on at least one of the yaw angular velocity, longitudinal acceleration, lateral acceleration and vehicle velocity detected by at least one of said sensors.

19. A vehicle slip angle measuring device according to claim 18, wherein said calculation means derives at least one of the following: (lateral acceleration−vehicle velocity×yaw angular velocity), (vehicle velocity×yaw angular velocity), (yaw angular velocity÷vehicle velocity), (yaw angular acceleration), and (longitudinal acceleration ×yaw angular velocity) as said at least one quantity of state.

20. A vehicle slip angle measuring device according to claim 11, wherein said correction means includes adding means for adding together the approximate value derived by said calculating means and the correction value estimated by said learned neural network, said adding means being operable to output a result of addition as said vehicle slip angle.

* * * * *